Sept. 5, 1961 E. B. DERR 2,998,981
VEHICLE RUNNING GEAR
Filed March 11, 1957 2 Sheets-Sheet 1
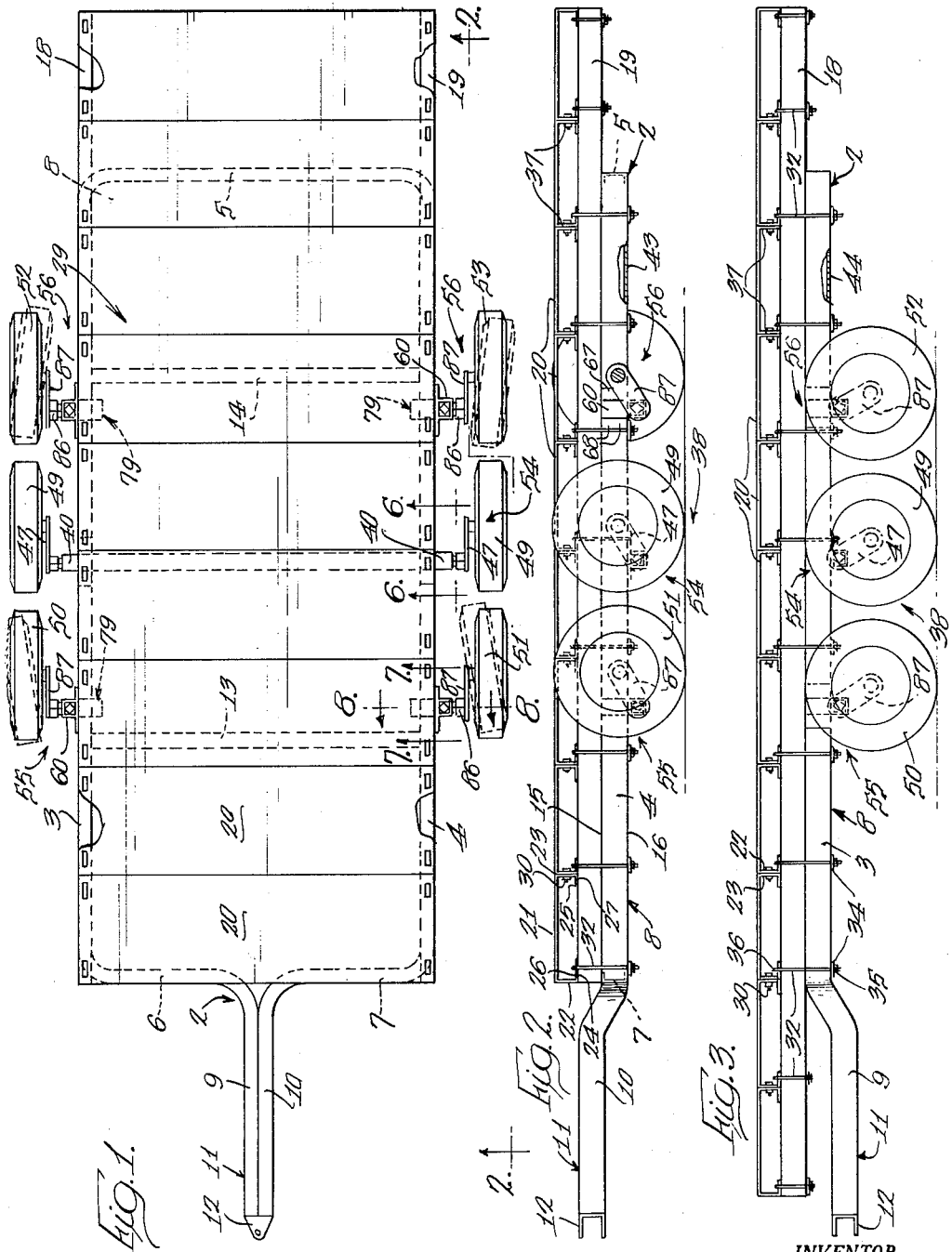
INVENTOR.
Elmer B. Derr
BY Paul O. Pippel
Atty.

Sept. 5, 1961 E. B. DERR 2,998,981
VEHICLE RUNNING GEAR
Filed March 11, 1957 2 Sheets-Sheet 2
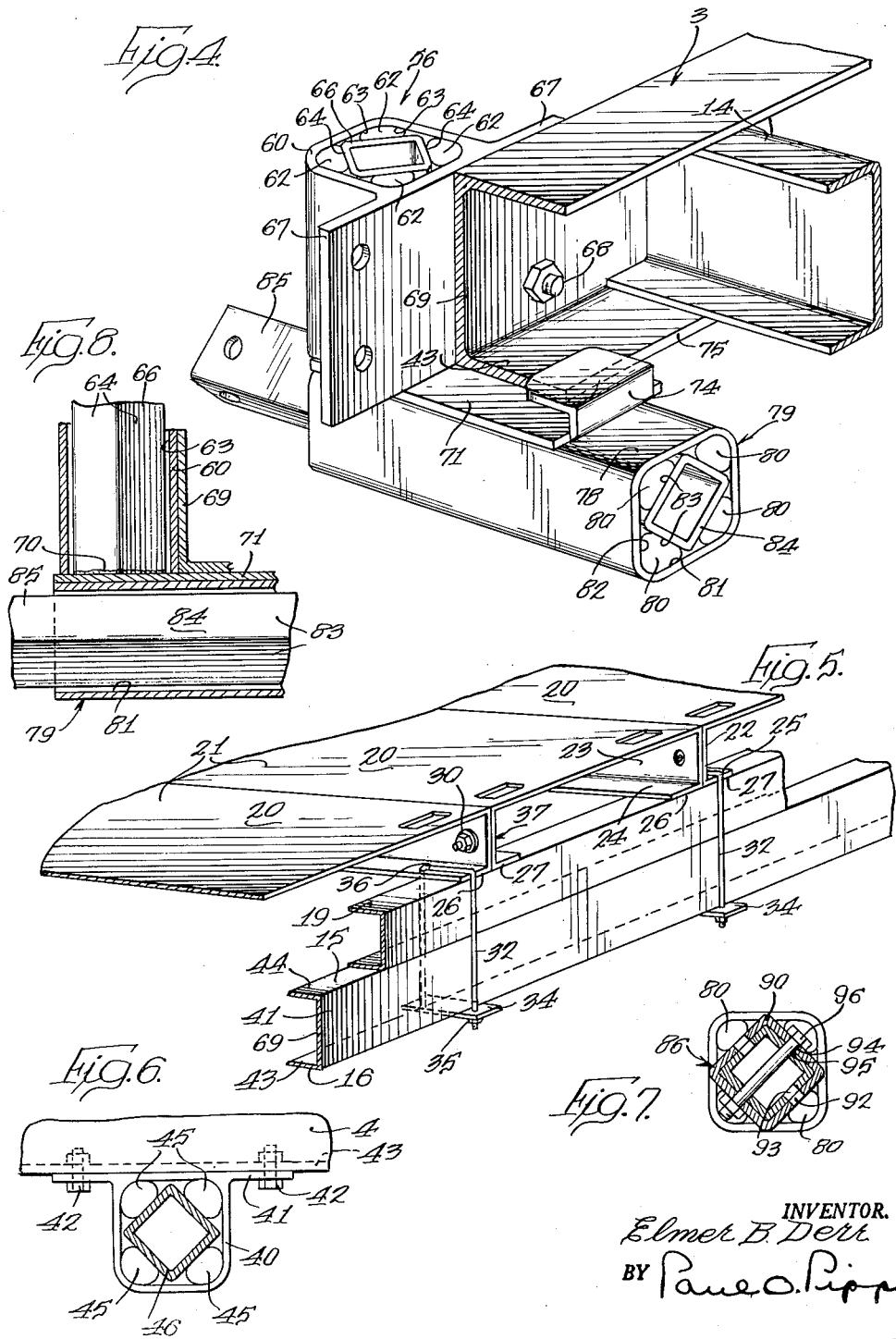
INVENTOR.
Elmer B. Derr
BY Paul O. Pippel
Atty.

United States Patent Office 2,998,981
Patented Sept. 5, 1961

2,998,981
VEHICLE RUNNING GEAR
Elmer B. Derr, Oak Park, Ill., assignor to International Harvester Company, Chicago, Ill., a corporation of New Jersey
Filed Mar. 11, 1957, Ser. No. 645,108
4 Claims. (Cl. 280—124)

This invention relates to vehicles and more specifically to a novel vehicle running gear.

A general object of the invention is to provide a novel vehicle running gear wherein the supporting wheel assemblies therefor are formed and arranged to be mounted thereon in a plurality of positions in order to provide a high bed or a low bed vehicle.

A further object of the invention is to provide a novel arrangement of parts wherein the platform or the bed of the vehicle is constituted of a plurality of modules or sections which are interconnected in side-by-side relation and extend widthwise longitudinally of the vehicle and which form spans or braces for interconnecting opposite sides of the running gear or the sill portions of the frame work and which also serve to interconnect the wheel supporting structures, the entire assembly so formed and arranged as to provide a flexible vehicle.

A still further object of the invention is to provide a novel and simplified running gear wherein the frame may be preferably formed of one piece with the tongue portion offset with respect to the plane of the bed of the running gear so that the frame may be turned up to form a high bed and reversed to provide a low bed and wherein the wheel and axle assemblies are formed and arranged to be detachably mounted with respect to the frame and which provide front and rear mountings comprising caster wheel structures pivotal on vertical axes to accommodate turning movements of the vehicle without unduly stressing or twisting the frame-work.

These and other objects of the invention become more apparent from the specification and the drawings wherein:

FIGURE 1 is a plan view of the novel vehicle shown in the low bed position;

FIGURE 2 is a side elevational view of the structure shown in the low bed position;

FIGURE 3 is a side elevational view illustrating the vehicle arranged in its high bed position;

FIGURE 4 is a fragmentary perspective view of the frame structure and one of the turnable caster wheel assemblies;

FIGURE 5 is a fragmentary side perspective view of the platform and frame structure;

FIGURE 6 is a transverse vertical sectional view taken substantially on the line 6—6 on an enlarged scale;

FIGURE 7 is a transverse vertical sectional view taken substantially on the line 7—7 of FIGURE 1; and FIGURE 8 is an enlarged sectional view taken substantially on the line 8—8 of FIGURE 1.

Describing the invention in detail the vehicle comprises a running gear generally designated 2 having a peripheral, though not necessarily, a continuous member which is shaped to form a pair of laterally spaced side sills 3 and 4 which run fore and aft lengthwise of the wagon along opposite sides thereof and at the rear ends are interconnected by a rear cross frame member 5. The forward ends of sills 3 and 4 merge into inwardly extending forward cross beam portions 6 and 7 which at their inner ends are bent or offset out of the plane of the bed portion 8 of the vehicle and merge into forwardly extending portions 9 and 10 which are joined together and extend fore and aft and provide a tongue generally indicated 11 which at its forward end is provided with a hitching jaw 12. It will be understood that although the structure herein thus far described comprises an integral member, the same may be formed of separate side and end pieces, etc., provided that the tongue 11 is offset vertically to the plane of the bed portion 8. The members 3 and 4 may be interconnected at strategic areas intermediate their ends by a plurality of cross pieces or beams 13 and 14 to strengthen the bed 8.

The bed 8 provides an obverse side 15 and a reverse side 16, and as shown in FIGURES 1 and 2 when the obverse side 15 is disposed at the top side the structure is a low bed vehicle. The side members 3 and 4 may support a pair of overlying side rails or beams 18 and 19 which in the low bed position of the structure may extend rearwardly of the rear cross member 5.

The side rails 18 and 19 support a plurality of modular sections or floor members 20, 20 and each of these segments 20 comprises a top wall 21, a pair of depending flanges 22 and 23, the lower ends of which are provided with inturned pedestal flanges 24 and 25 which seat at 26 and 27 against the top side of the associated side rail 18 and 19. The modules are elongated transversely of the vehicle and are arranged side-by-side lengthwise of the vehicle in order to provide the bed generally designated 21. It will be seen that the abutting flanges 22, 23 of adjacent sections 20, 20 are bolted together as at 30, 30 through enlarged openings in order to provide a unified flooring and that the modules as well as the related sill members 18 and 19 are all clamped together and fastened to the related side sill 3 or 4 of the frame work by means of U-bolts 32 which pass through appropriate openings in the flanges 24 of each section and the entire assembly is connected to the undercarriage by the crosspiece 34 which is underposed with respect to the related frame sill member 3 or 4. The nuts 35 are drawn up under the plate 34 whereby the bight portion 36 is drawn against the related flange clamping the entire assembly together.

It will be appreciated that the channel sectional form of each of the modules increases the transverse rigidity of the vehicle and their narrow width lengthwise of the vehicle provides a series of braces or girder structures generally designated 37 which are developed between the abutting flanges of the contiguous modules but that the individual floor elements are vertically tiltable transversely of the vehicle.

In a vehicle of the type under consideration that is extremely long bed wagons, it is particularly important to control such transverse rigidity in order to maintain steering as well as tracking geometry of the tandem supporting wheel assembly generally designated 38. It is also desirable preferably to accommodate transverse flexing of the vehicle so that the vehicle can freely follow terrain conditions and this is accommodated by the construction shown of the segments 20 as heretofore stated.

The tandem wheel mounting 38 incorporates an intermediate tubular axle structure 40 which is preferably square in cross section and which is provided adjacent to each end with mounting flanges 41 which are removably bolted as by bolts 42 to the flange 43 of the associated sill member 3 or 4 in the low bed position of the vehicle and to the flange 44 in the high bed position as shown in FIGURE 3. The tubular axle structure 40 is preferably centrally located with respect to the members 3 and 4. Resilient supports or cushions 45 are provided interposed between the interior of 40 and the exterior of an inner preferably square member 46 which projects outwardly beyond the ends of the outer member 40. Opposite ends of member 46 are connected to cranks 47 which extend in the low bed position of FIGURES 1 and 2 upwardly and rearwardly thus trailingly with respect to the generally horizontal axis of rotation of the inner member 36 with respect to the outer member 40. The rearward extremities of cranks 47 are provided with outstanding spindles which provide journals for the wheel 49.

The tandem wheel assembly further comprises four substantially identical steerable caster wheel structures 50, 51, 52 and 53, the assemblies 50 and 51 being disposed forwardly of the immediate assembly 54 and the assemblies 52 and 53 being coaxially arranged and disposed rearwardly of the assembly 54. Thus a six wheel trailer is developed including a forward assembly generally designated 55, the intermediate assembly 54 and a rear assembly 56 with three wheels 51, 49 and 53 on one side of the vehicle and wheels 50, 49 and 52 on the opposite side of thje vehicle and in straight-away position the wheels 50, 49, 52 are aligned fore and aft and the wheels 51, 49 and 53 at the opposite side of the vehicle are also arranged fore and aft. The forward and rearward wheel assemblies as heretofore stated are of substantially identical construction and therefore an explanation of only one of these units will suffice. For this purpose the assembly 56 has been chosen for particular illustration in FIGURE 4 and the assembly 55 in FIGURE 8. Inasmuch as the parts are identical the same reference numerals will apply to all common structure.

The vertical journal comprises an upright housing portion 60 preferably square in cross section in each of the corners of which there is provided a cylindrical cushion of resilient material 62 which is confined between the opposing sides 63 of the interior of the square housing 60 and an opposing flat side 64 of an inner spindle member 66 which is also substantially square in cross section and having its sides 64 disposed across and opposing the respective corners of the squared outer portion and engaging the associated cushion 62 as best seen in FIGURE 4. The spindle 66 is thus controllably rotatable on a substantially vertical axis with respect to the fixed outer housing portion 60 which comprise a mounting flange 67 suitably removably bolted as by bolts 68 to the vertical or outboard wall 69 of the associated side sill member 3 or 4. The lower end 70 of the spindle 66 is fixed preferably as by welding to a plate 71 which is underposed with respect to the related side sill 3 or 4, and extending inwardly of the wall 69 and engaging the underside of the flange or web 43 or 44 depending on the position of the bed as shown in FIGURES 1 and 2 or in FIGURE 3. The plate 71 thus has sliding movement with respect to the related sill and at its inner extremity 73 is provided with a hook portion 74 or a clamp which hooks over the free edge or the inboard edge 75 of the flanges 43 and 44 depending upon the position of the bed. The hook portion is provided clearance with respect to the edge 75 in order to accommodate the aforementioned movement.

The plate 71 is preferably weld-connected to the top wall 78 of the outer tubular horizontal axle structure generally designated 79. The axle structure 79 is substantially square in cross section and as is best seen in FIGURE 4 it too confines at its corners four cylindrical cushions 80 of resilient material which are compressed between the sides 81 and 82 of each corner and the opposing flat surface 83 of the inner member or axle 84 which is also substantially square in cross section. It will be seen that the axle 84 is thus accommodated rotational movement on a substantially horizontal axis and that the entire axle structure 79 is accommodated pivotally or steering movement about a substantially vertical axis by means of the spindle 66 which is controllably held in a position disposing the related wheel in predetermined fore and aft position under normal conditions.

The outer extremity of the axle structure 85 of the axle structure 84 projects outwardly of the outer end of the outer member 79 and is there connected to the forward end 86 of a crank arm 87 which at its rear extremity is provided with a single rotatably journalling associated wheels 50, 51 or 52 or 53.

As best seen in FIGURE 1 upon either turning leftwardly or rightwardly the front and rear steerable caster wheel assemblies are deflected angularly in order to accomplish the turn. However, on the force being removed the wheels will align straight ahead and the vehicle will proceed in its normal forward direction.

Referring now to FIGURE 7 it will be observed that the portion 86 in each of the assemblies may be a square socket portion 90 which telescopes over the outer end of the associated axle structure and is accommodated connection in a plurality of positions through openings 92, 93, or 94, 95 by a bolt 96 in order to position the arms either extending downwardly and rearwardly or upwardly and rearwardly as seen in FIGURES 3 and 2 respectively.

It will be appreciated that the socket 90 of the arm assemblies 87 and 47 are identical but that to clarify the disposition and the function of the various wheel assemblies the different reference numerals have been applied to more aptly direct the attention of the reader.

Thus it will be appreciated that a novel vehicle has been provided which not only accommodates flexing in accordance with undulations in the road but at the same time a controlled steering geometry is obtained which is maintained by the modular construction of the platform. Furthermore, it will be observed that the vehicle may be made up into a series of different lengths depending upon the needs of the user and that inasmuch as the sections are of identical construction problems of inventory by dealers and manufacturers is minimized.

What is claimed is:

1. A wheel mounting comprising an outer tubular member and a coaxial inner member having inner and outer surfaces respectively transaxially spaced from each other, resilient material interposed between said surfaces and formed and arranged therewith to yieldably resist relative rotation therebetween on a first axis, a housing having means for fastening to an associated vehicle frame and having a vertical opening, a spindle connected to said outer member and extending vertically through said opening, yieldable material interposed between said spindle and said housing and formed and arranged therewith to yieldably resist rotation of the spindle with said outer member on a substantially vertical axis said outer member having a vehicle running gear engaging surface for frictionally resisting said rotation of the spindle.

2. A flexible vehicle running gear comprising a frame, a bed supported thereon, a plurality of individual wheel and axle assemblies arranged in tandem in supporting relation to said frame and each separately connected to a different portion of the frame and movable in transverse deflection therewith; one of said assemblies including a transverse tubular outer member connected to the frame, an inner member extending through the outer member, and cushions of yieldable material interposed between said inner and outer members, and arranged to resist relative movement therebetween transaxially and circumferentially, cranks connected to opposite ends of said inner member, and wheels spindled upon said cranks; another of said assemblies including individual units disposed at opposite sides of the frame and each unit including a wheel carrying arm, a horizontal shaft connected thereto, mounting means on the frame including a first housing receiving said shaft, yieldable material interposed between the shaft and housing for resisting rotary movement therebetween, a second housing mounted upon the frame and having a vertical opening therein, a vertical spindle connected to the first housing and extending through said opening, and yieldable material interposed between the spindle and the second housing for resisting horizontal swinging movement of the associated arm and wheel.

3. In a vehicle; a longitudinal frame; three wheel and axle assemblies disposed in supporting relation to the frame and including front, rear and intermediate assemblies; said intermediate assembly comprising an outer tube extending transversely of the frame, an inner member extending through the tube and having a trailing arm at each end, a wheel mounted on each arm, resilient material interposed between the inner member and the tube resisting rotation therebetween with attendant upward movement of the wheels; each front and rear assembly comprising a housing extending transversely of the frame, a torque member within the housing having an outer arm end and wheel means mounted on the arm end, resilient material interposed between the housing and torque member resisting rotational movement therebetween about a horizontal axis, a hollow element mounted on the frame, a spindle connected to the housing and projecting vertically into the hollow member, and resilient material interposed between the bottom element and said spindle and resisting rotation of the housing with said torque member and wheel means about a vertical axis, said housing frictionally and slidably engaging the frame along generally flat surfaces extending transaxially of the spindle to resist rotation thereof.

4. The invention according to claim 3 and said frame presenting a generally horizontal portion, and the housing having a lug overlaying the nut and embracing the same with the housing and interlocking the housing and frame against vertical separation.

References Cited in the file of this patent

UNITED STATES PATENTS

| | | |
|---|---|---|
| 1,029,843 | Bettermann | June 18, 1922 |
| 1,534,458 | Mohl | Apr. 21, 1925 |
| 2,072,787 | Anderson | Mar. 2, 1937 |
| 2,194,964 | Willson | Mar. 26, 1940 |
| 2,256,037 | Reid | Sept. 16, 1941 |
| 2,363,170 | Fontaine | Nov. 21, 1944 |
| 2,395,640 | Pearson | Feb. 26, 1946 |
| 2,495,557 | Walsh | Jan. 24, 1950 |
| 2,552,320 | Huber | May 8, 1951 |
| 2,667,361 | Jones | Jan. 26, 1954 |
| 2,670,217 | Hruza | Feb. 23, 1954 |
| 2,708,586 | Wagner | May 17, 1955 |
| 2,712,742 | Neidhart | July 12, 1955 |
| 2,842,377 | Ronning | July 8, 1958 |

FOREIGN PATENTS

| | | |
|---|---|---|
| 148,255 | Great Britain | Oct. 6, 1921 |